US012698027B2

(12) United States Patent
Moon

(10) Patent No.: US 12,698,027 B2
(45) Date of Patent: Aug. 4, 2026

(54) STEERING DEVICE OF VEHICLE

(71) Applicant: HL MANDO Corporation, Pyeongtaek (KR)

(72) Inventor: SungJune Moon, Seoul (KR)

(73) Assignee: HL MANDO CORPORATION, Pyeongtaek (KR)

( * ) Notice: Subject to any disclaimer, the term of this patent is extended or adjusted under 35 U.S.C. 154(b) by 667 days.

(21) Appl. No.: 18/160,284

(22) Filed: Jan. 26, 2023

(65) Prior Publication Data

US 2023/0234635 A1      Jul. 27, 2023

(30) Foreign Application Priority Data

Jan. 27, 2022      (KR) ........................ 10-2022-0012387

(51) Int. Cl.
| | |
|---|---|
| *F16H 57/029* | (2012.01) |
| *B62D 5/04* | (2006.01) |
| *F16C 33/74* | (2006.01) |
| *F16H 57/00* | (2012.01) |
| *F16H 57/02* | (2012.01) |
| *F16H 57/04* | (2010.01) |

(52) U.S. Cl.
CPC ............ *B62D 5/0454* (2013.01); *F16C 33/74* (2013.01); *F16H 57/029* (2013.01); *F16H 57/0498* (2013.01); *F16H 57/0006* (2013.01); *F16H 2057/02034* (2013.01); *F16H 2057/02082* (2013.01)

(58) Field of Classification Search
CPC .......... B62D 5/0454; B62D 3/10; B62D 3/04;

B62D 5/0445; F16C 33/74; F16C 33/723; F16C 33/7889; F16C 33/7886; F16C 33/6603; F16H 57/029; F16H 58/0006; F16H 57/0498; F16H 2057/02034; F16H 57/0464; F16H 57/04; F16H 1/16; F16H 2025/209; F61H 2057/02082

See application file for complete search history.

(56) References Cited

U.S. PATENT DOCUMENTS

2019/0040945 A1 *   2/2019   Ueda ..................... F16H 57/022

FOREIGN PATENT DOCUMENTS

| | | | | |
|---|---|---|---|---|
| DE | 102020114836 A1 * | 12/2021 | ............ | F16C 19/166 |
| JP | 2005344853 A * | 12/2005 | ........... | F16H 57/041 |
| KR | 10-2111294 B1 | 5/2020 | | |

OTHER PUBLICATIONS

Espace translation of DE 10 2020114836 A1 (Year: 2020).*
Espace translation of JP 2005344853 A (Year: 2005).*
Office Action from Korean Patent Office issued on Oct. 9, 2025 for Korean Patent Application No. 10-2022-0012387.

* cited by examiner

*Primary Examiner* — Vivek D Koppikar
*Assistant Examiner* — Scott Lawrence Strickler
(74) *Attorney, Agent, or Firm* — Harvest IP Law, LLP

(57) ABSTRACT

According to the present embodiments, it is possible to mitigating noise by preventing degradation of lubrication performance due to mixture of greases with different properties in a gear housing.

14 Claims, 7 Drawing Sheets

STEERING DEVICE OF VEHICLE

CROSS-REFERENCE TO RELATED APPLICATION

This application claims priority from Korean Patent Application No. 10-2022-0012387, filed on Jan. 27, 2022, which is hereby incorporated by reference for all purposes as if fully set forth herein.

BACKGROUND

Field

The present embodiments relate to a vehicle steering device and, more specifically, to a vehicle steering device capable of mitigating noise by preventing degradation of lubrication performance due to mixture of greases with different properties in a gear housing.

Description of Related Art

In general, a vehicle steering device includes a power assist device that assists the driver's steering force by driving the driving unit by an electronic control unit according to the vehicle driving condition detected by, e.g., a vehicle velocity sensor or a steering torque sensor.

Structures often used in such a power assist device include a structure that includes a worm wheel coupled to the steering shaft, a worm shaft engaged with the worm wheel, and a motor for driving the worm shaft to generate auxiliary torque. Grease is applied to, e.g., the bearing supporting rotation of the worm shaft and the engaged portion of the worm shaft and the worm wheel to smoothly rotate the worm wheel and the worm shaft within the housing. The grease has different properties depending on the object which it is to lubricate. In other words, the gear teeth of the worm wheel are typically formed of plastic, and the gear teeth of the worm shaft and the bearing are formed of steel. Accordingly, the grease applied to the bearing to support rotation of the worm shaft and the grease applied to the engaged portion of the worm shaft and the worm wheel have different properties.

When the power assist device is actually mounted in the vehicle, the worm shaft is disposed inclined from, rather than parallel to, the ground when it is considered to be deployed with the surrounding components. Thus, the grease applied to the engaged portion of the worm shaft and the worm wheel may be introduced to the bearing, so that the greases with different properties are mixed, degrading the lubrication performance and causing noise. Even when a bearing with a shield for preventing greases from being mixed is used, grease may be mixed through an unavoidable gap that is caused as it is difficult to completely close the space between the inner and outer rings.

BRIEF SUMMARY

The present embodiments have been conceived in the foregoing background and relate to a vehicle steering device capable of mitigating noise by preventing degradation of lubrication performance due to mixture of greases with different properties in a gear housing.

According to the present embodiments, there may be provided a vehicle steering device, comprising a worm shaft including a gear portion having a worm gear engaged with a worm wheel, a first end portion coupled to a worm housing by a first bearing and connected with a motor, and a second end portion coupled to the worm housing by a second bearing and a spacer positioned between the gear portion and the second bearing to prevent a grease applied to the worm gear from being introduced to the second bearing.

According to the present embodiments, it is possible to mitigating noise by preventing degradation of lubrication performance due to mixture of greases with different properties in a gear housing.

DESCRIPTION OF DRAWINGS

The above and other objects, features, and advantages of the disclosure will be more clearly understood from the following detailed description, taken in conjunction with the accompanying drawings, in which.

DETAILED DESCRIPTION

Figure 1:
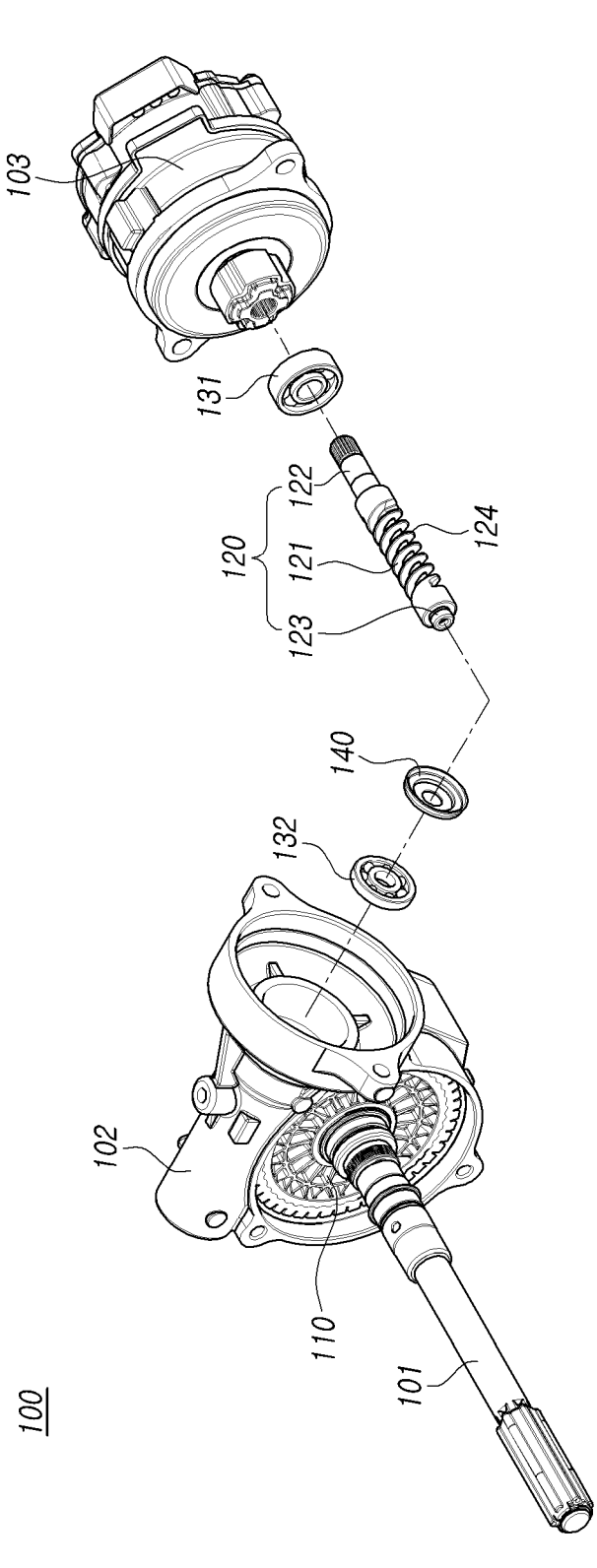
FIG. 1 is an exploded perspective view illustrating a steering column for a vehicle according to the present embodiments.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element.

Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 2:
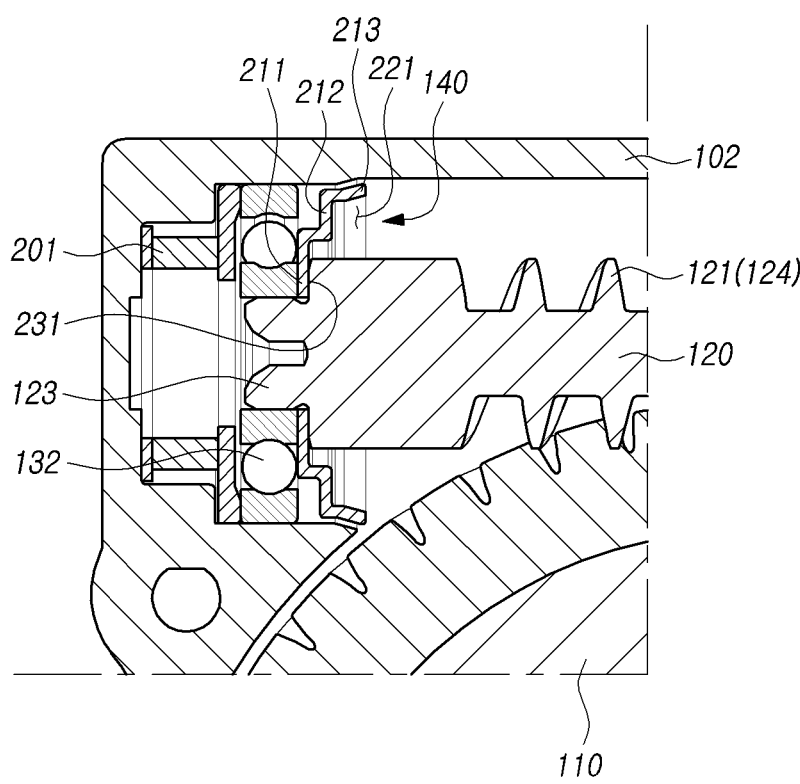
FIG. 2 is a partial, cross-sectional view illustrating an assembled state of FIG. 1.
Figure 3:
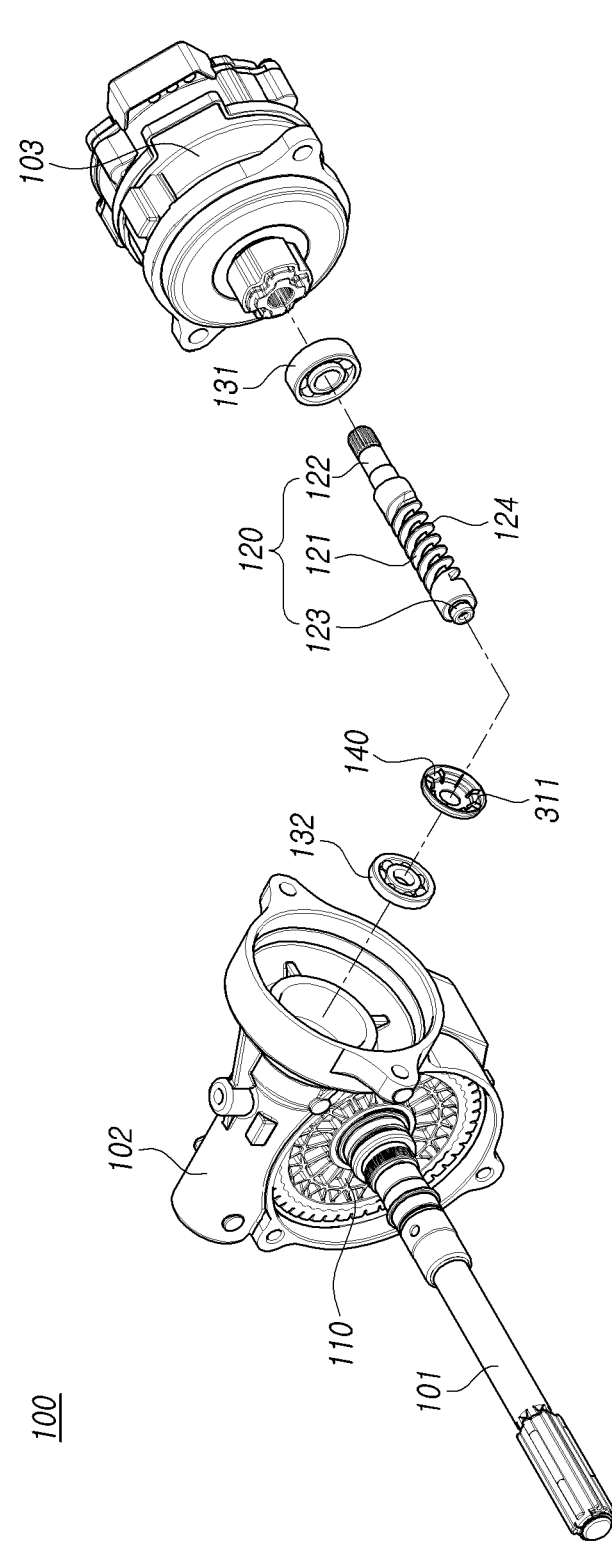
FIG. 3 is an exploded perspective view illustrating a steering column for a vehicle according to the present embodiments.
Figure 4:
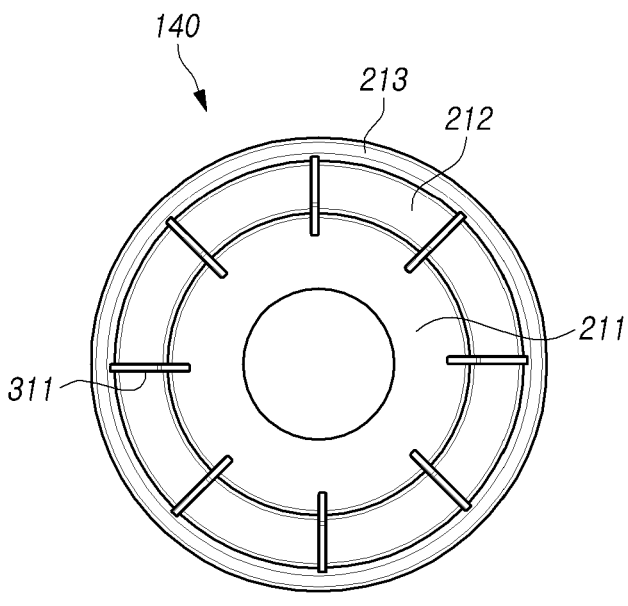
FIG. 4 is a front view illustrating a portion of a steering device of a vehicle according to the present embodiments.
Figure 5:
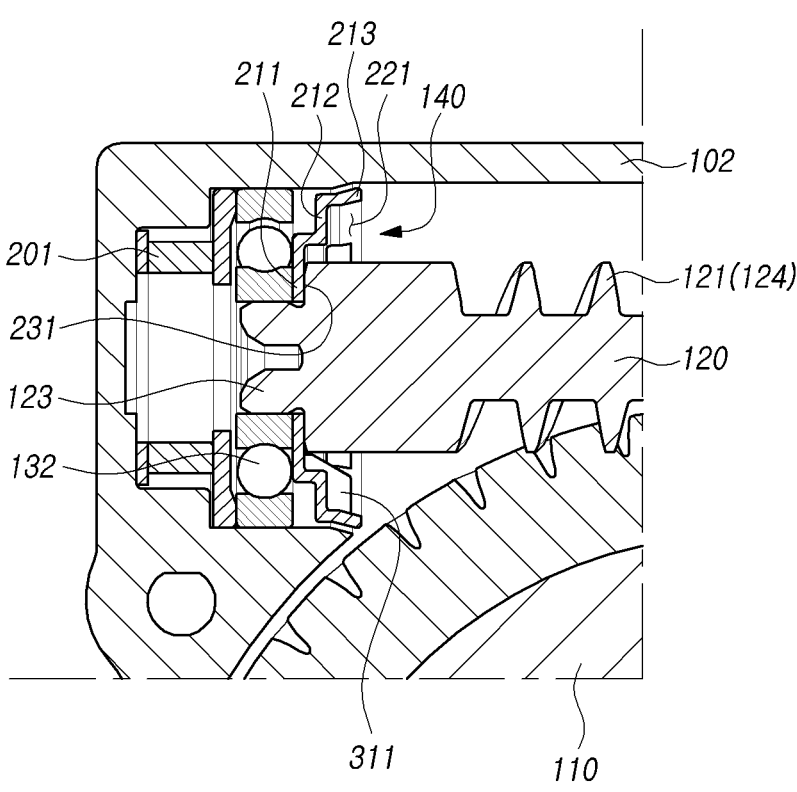
FIG. 5 is a partial, cross-sectional view illustrating an assembled state of FIG. 3.
Figure 6A:
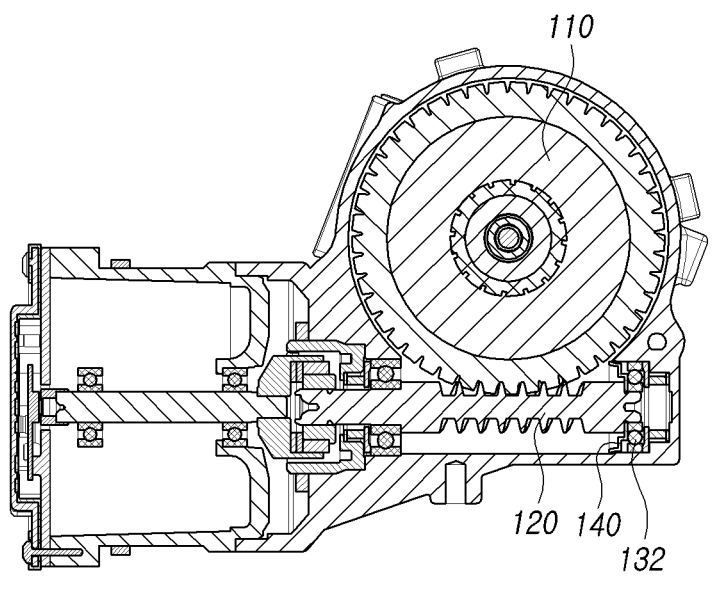
FIGS. 6A and 6B are views illustrating an example of disposing a vehicle steering device according to the present embodiments.
Figure 6B:
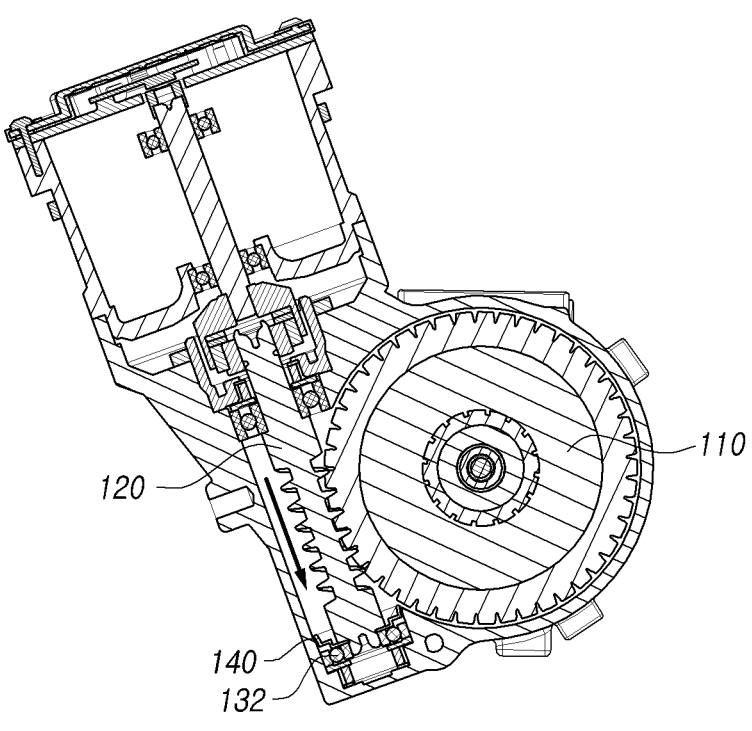

FIG. 1 is an exploded perspective view illustrating a steering column for a vehicle according to the present embodiments. FIG. 2 is a partial, cross-sectional view illustrating an assembled state of FIG. 1. FIG. 3 is an exploded perspective view illustrating a steering column for a vehicle according to the present embodiments. FIG. 4 is a front view illustrating a portion of a steering device of a vehicle according to the present embodiments. FIG. 5 is a partial, cross-sectional view illustrating an assembled state of FIG. 3. FIGS. 6A and 6B are views illustrating an example of disposing a vehicle steering device according to the present embodiments.

According to the present embodiments, a vehicle steering device 100 comprises a worm shaft 120 including a gear portion 121 having a worm gear 124 engaged with a worm wheel 110, a first end portion 122 coupled to a worm housing 102 by a first bearing 131 and connected with a motor 103, and a second end portion 123 coupled to the worm housing 102 by a second bearing 132, and a spacer 140 positioned between the gear portion 121 and the second bearing 132 to prevent a grease applied to the worm gear 124 from being introduced to the second bearing 132.

Referring to FIG. 1, as the worm wheel 110 coupled to the steering shaft 101 and the worm shaft 120 connected to the motor 103 are engaged, the torque of the motor 103 reduced at the reduction ratio of the worm wheel 110 and the worm shaft 120 is provided to the steering shaft 101. The worm gear 124 is formed in the gear portion 121 of the worm shaft 120, and the worm gear 124 is engaged with the gear teeth of the worm wheel 110. The worm housing 102 receives the worm wheel 110 and the worm shaft 120, and the first bearing 131 and the second bearing 132 for supporting rotation of the worm shaft 120 with respect to the worm housing 102 are coupled to the first end portion 122 and the second end portion 123, respectively.

For smooth rotation, grease is applied to the first bearing 131 and the second bearing 132 for supporting rotation of the worm shaft 120. Further, grease is applied to the gear teeth of the worm wheel 110 and the worm gear 124 for the purposes of smooth rotation and torque transfer. The grease applied to the first bearing 131 and the second bearing 132 and the grease applied to the gear teeth of the worm wheel 110 and the worm gear 124 have different properties. For example, the grease applied to the first bearing 131 and the second bearing 132 may be grease for lubricating steel-to-steel contact. The grease applied to the gear teeth of the worm wheel 110 and the worm gear 124 may be grease for lubricating the contact between plastic and steel. When different greases are mixed, the properties of the grease may be changed and the lubricating performance as initially intended may not be exhibited, causing noise and friction.

Referring to FIGS. 6A and 6B, if the worm shaft 120 is disposed parallel to the ground as shown in FIG. 6A, the grease applied to the worm wheel 110 and the worm gear 124 and the grease applied to the first bearing 131 and the second bearing 132 may hardly be mixed, with the respective properties of the greases maintained while continuously exhibiting high lubrication performance. However, it is difficult to place the steering device in the vehicle with the worm shaft 120 positioned parallel to the ground, due to space limitations with the surrounding components and, in practice, it is typical to dispose the worm shaft 120 inclined from the ground as shown in FIG. 6B. In this case, the grease applied to the worm wheel 110 and the worm gear 124 is moved by gravity in the direction of the arrow shown in the drawings and accumulates on the side of the second bearing 132. The accumulated grease flows into the second bearing 132 over time, so that greases with different properties are mixed, degrading lubricating performance and resultantly causing noise and friction.

In particular, a damper 201 axially disposed between the second bearing 132 and the worm housing 102 is provided to absorb the axial load generated on the worm shaft 120 (refer to FIG. 2), and instantaneous pressure generated when the damper 201 reacts may accelerate influx of the grease accumulated on the second bearing 132 to the second bearing 132.

Referring to FIGS. 1 and 2, the vehicle steering device 100 according to the present embodiments includes a spacer 140 for preventing the grease applied to the worm gear 124 from flowing to the second bearing 132. The spacer 140 is positioned between the gear portion 121 and the second bearing 132. The engaged area of the worm shaft 120 and the worm wheel 110 and the area where the second bearing 132 is rotated are spatially separated by the spacer 140 in the worm housing 102, preventing mixture of the greases. In other words, the spacer 140 prevents direct influx of the grease from the worm gear 124 to the second bearing 132 or accumulation on the surface of the second bearing 132.

According to an embodiment, the spacer 140 may be shaped as a ring and be coupled to the second end portion 123. The spacer 140 may be formed to have a through hole in the center to be coupled to the second end portion 123 of the worm shaft 120. The spacer 140 may be disposed so that one axial surface faces the worm gear 124 while the other axial surface faces the second bearing 132, thus spatially separating the engaged area of the worm shaft 120 and the worm wheel 110 and the area where the second bearing 132 is rotated.

According to an embodiment, the spacer 140 may be formed to have a receiving portion 221 for receiving grease between the spacer 140 and the outer circumferential surface of the worm shaft 120. The receiving portion 221 is an empty space open toward the worm gear 124 and serves as a pocket where the grease for lubricating engagement between the worm shaft 120 and the worm wheel 110 is accumulated, thereby preventing mixture of the greases. In other words, the receiving portion 221 receives the grease from the worm gear 124 not to enter the second bearing 132. The receiving portion 221 is defined by the inner surface of the spacer 140 and the outer circumferential surface of the worm shaft 120.

According to an embodiment, the spacer 140 may include a disc portion 212 having one surface facing the worm gear 124 and a ring portion 213 extending from an outer end of the disc portion 212 to the worm gear 124 so that the inner surface faces the outer circumferential surface of the worm shaft 120. The disc portion 212 is connected with a coupling portion 211 described below, and the receiving portion 221 which is open toward the worm gear 124 is formed between the outer circumferential surface of the worm shaft 120 and the spacer 140 by the coupling portion 211, the disc portion 212, and the ring portion 213. Accordingly, although the grease applied to the worm gear 124 is moved toward the second bearing 132 by the influence of gravity, the grease is accumulated in the receiving portion 221 and is prevented from being mixed with the grease applied to the second bearing 132.

The ring portion 213 may be formed to have a diameter increasing toward the worm gear 124. In other words, the diameter of the ring portion 213 may increase as it extends from an end of the disc portion 212 to the worm gear 124. Accordingly, the grease moved from the worm gear 124 to the second bearing 132 may be more easily accumulated in the receiving portion 221 and be prevented from being mixed. Meanwhile, the outer surface of the ring portion 213 may be spaced apart from the worm housing 102. Therefore, as described below, it is possible to prevent friction between the spacer 140 and the worm housing 102 when the spacer 140 is rotated along with the worm shaft 120.

According to an embodiment, the spacer 140 may be rotated along with the worm shaft 120. The spacer 140 may be coupled to the second end portion 123 of the worm shaft 120 and be rotated along with the inner ring of the second bearing 132. To rotate together with the worm shaft 120, the spacer 140 may include a coupling portion 211 that is supported on the inner ring of the second bearing 132. In other words, the second end portion 123 may have a diameter smaller than that of the gear portion 121, forming a stepped portion 231 on the outer circumferential surface of the worm shaft 120. The spacer 140 may include the coupling portion 211 coupled between the stepped portion 231 and the inner ring of the second bearing 132. The coupling portion 211 may be pressurized and fixed between the stepped portion 231 and the inner ring of the second bearing 132, so that the spacer 140 may be rotated along with the worm shaft 120.

Referring to FIGS. 3 to 5, the spacer 140 may include a wing portion 311 protruding from the surface of the spacer 140, facing the worm gear 124. In other words, the wing portion 311 may axially protrude from one axial surface of the spacer 140 facing the worm gear 124. The wing portion 311 may be positioned in the receiving portion 221.

As the spacer 140 is rotated together with the worm shaft 120, the wing portion 311 may supply the grease, which has been moved from the worm gear 124 to the second bearing 132, back to the worm gear 124. In other words, the wing portion 311 may supply the grease back to the worm gear 124 and the worm wheel 110 by scattering the grease from the worm gear 124. Accordingly, the grease from the worm gear 124 may be prevented from being accumulated in the receiving portion 221, and the grease applied to the gear teeth of the worm wheel 110 and the worm gear 124 may be prevented from being lost while being moved toward the second bearing 132.

According to an embodiment, the wing portion 311 may be formed over the coupling portion 211, the disc portion 212, and the ring portion 213. Accordingly, the grease may be prevented from being accumulated on the surface of the coupling portion 211, disc portion 212, or ring portion 213 by the wing portion 311. A plurality of wing portions 311 may be formed to be spaced apart from each other in the circumferential direction to more effectively prevent grease accumulation.

The so-shaped vehicle steering device may mitigate noise by preventing degradation of lubrication performance due to mixture of greases with different properties in a gear housing.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed is:

1. A vehicle steering device, comprising:
a worm shaft including a gear portion having a worm gear engaged with a worm wheel, a first end portion coupled to a worm housing by a first bearing and connected with a motor, and a second end portion coupled to the worm housing by a second bearing; and
a spacer positioned between the gear portion and the second bearing to prevent a grease applied to the worm gear from being introduced to the second bearing,
wherein the spacer includes a wing portion protruding from a surface of the spacer facing the worm gear,
wherein the wing portion includes an obliquely angled portion extending in a direction toward the worm gear, such that a gap is defined between the obliquely angled portion and an outer circumferential surface of the worm shaft, and a distance across the gap increases along the direction toward the worm gear.

2. The vehicle steering device of claim 1, wherein the spacer is shaped as a ring and is coupled to the second end portion.

3. The vehicle steering device of claim 1, wherein the spacer has a receiving portion for receiving the grease between the spacer and an outer circumferential surface of the worm shaft.

4. The vehicle steering device of claim 3, wherein the spacer includes a disc portion having one surface facing the worm gear and a ring portion extending from an outer end of the disc portion to the worm gear so that an inner surface faces the outer circumferential surface of the worm shaft.

5. The vehicle steering device of claim 4, wherein the ring portion increases in diameter toward the worm gear.

6. The vehicle steering device of claim 5, wherein an outer surface of the ring portion is spaced apart from the worm housing.

7. The vehicle steering device of claim 4, wherein the spacer is rotated together with the worm shaft.

8. The vehicle steering device of claim 7, wherein the second end portion has a diameter smaller than that of the gear portion to form a stepped portion on the outer circumferential surface of the worm shaft, and wherein the spacer includes a coupling portion coupled between the stepped portion and an inner ring of the second bearing.

9. The vehicle steering device of claim 8, wherein the wing portion is positioned in the receiving portion.

10. The vehicle steering device of claim 8, wherein the wing portion is formed over the coupling portion, the disc portion, and the ring portion.

11. The vehicle steering device of claim 8, wherein a plurality of wing portions spaced apart from each other in a circumferential direction are provided.

12. The vehicle steering device of claim 1, wherein the spacer is shaped as a ring, with an outer end of the spacer being adjacent to the worm housing and the second end portion of the worm shaft being coupled through an inner end of the spacer, and an area where the worm shaft and worm wheel engage and an area where the second bearing rotates are spatially separated by the spacer.

13. The vehicle steering device of claim 1, wherein the spacer comprises:

a coupling portion having the second end portion penetrating therethrough and coupled between an inner ring of the second bearing and the second end portion of the worm shaft;

a disc portion connected to the coupling portion and extending toward the worm housing and the worm gear; and a ring portion extending from an outer end of the disc portion toward the worm housing and the worm gear, an outer end of the ring portion is adjacent to the worm housing.

14. The vehicle steering device of claim 1, further comprising a damper axially coupled between the second bearing and the worm housing to axially support the second end portion of the worm shaft.

* * * * *